United States Patent
Havard, Jr. et al.

(10) Patent No.: US 9,677,797 B2
(45) Date of Patent: Jun. 13, 2017

(54) INVERTER CONTROLLER, METHOD OF OPERATION THEREOF AND FIELD-INSTALLABLE RETROFIT KIT INCORPORATING THE SAME

(75) Inventors: Harold Gene Havard, Jr., Terrell, TX (US); Eric M. Perez, Hickory Creek, TX (US); Terry D. Jewell, Dallas, TX (US); Der-Kai Hung, Dallas, TX (US)

(73) Assignee: Lennox Industries Inc., Richardson, TX (US)

( * ) Notice: Subject to any disclaimer, the term of this patent is extended or adjusted under 35 U.S.C. 154(b) by 646 days.

(21) Appl. No.: 13/327,475

(22) Filed: Dec. 15, 2011

(65) Prior Publication Data
US 2013/0153197 A1 Jun. 20, 2013

(51) Int. Cl.
*G05D 15/00* (2006.01)
*F25B 49/02* (2006.01)
*F24F 11/00* (2006.01)

(52) U.S. Cl.
CPC ....... *F25B 49/02* (2013.01); *F24F 2011/0064* (2013.01); *F25B 2600/021* (2013.01); *F25B 2600/11* (2013.01); *Y02B 30/741* (2013.01)

(58) Field of Classification Search
CPC ................. G05D 23/2754; F25B 49/02; F25B 2600/021; F25B 2600/11; F24F 2011/0064; Y02B 30/741
USPC ........................................................ 236/74 R
See application file for complete search history.

(56) References Cited

U.S. PATENT DOCUMENTS

| | | | |
|---|---|---|---|
| 4,085,594 A * | 4/1978 | Mayer | 62/171 |
| 4,293,027 A * | 10/1981 | Tepe et al. | 165/250 |
| 5,161,608 A * | 11/1992 | Osheroff | 165/208 |
| 6,246,207 B1 * | 6/2001 | VanSistine et al. | 318/801 |
| 7,272,302 B2 * | 9/2007 | Woodward et al. | 388/801 |
| 7,673,809 B2 * | 3/2010 | Juntunen | 236/78 R |
| 2007/0084938 A1 * | 4/2007 | Liu | 236/91 D |
| 2007/0209653 A1 * | 9/2007 | Beisheim et al. | 126/80 |
| 2007/0289322 A1 * | 12/2007 | Mathews | 62/225 |
| 2010/0269520 A1 * | 10/2010 | Moore | F24F 3/1405 62/89 |

FOREIGN PATENT DOCUMENTS

JP 2000088300 A * 3/2000
JP 2010009105 A * 1/2010

OTHER PUBLICATIONS

Michihiro et al., Ventilation Device for Reform, Mar. 31, 2000, JP2000088300A, Whole Document.*
Yuhei, Vending Machine, Jan. 14, 2010, JP2010009105A, Whole Document.*

* cited by examiner

*Primary Examiner* — Larry Furdge
(74) *Attorney, Agent, or Firm* — Baker Botts L.L.P.

(57) ABSTRACT

An inverter controller, a method of operating a controller and a field-installable kit. In one embodiment, the controller includes: (1) a thermostat interface configured to receive conventional thermostat signals providing for a ventilation mode, first- and second-stage cooling modes and at least one heating mode and provide relay control signals for an inverter forward start relay, first- and second-stage cooling speed select relays and at least one heating relay and (2) an inverter controller coupled to the thermostat interface and configured to receive the relay control signals and provide an inverter forward start signal, an inverter high speed set, an inverter medium speed set and an inverter ventilation speed set.

20 Claims, 3 Drawing Sheets

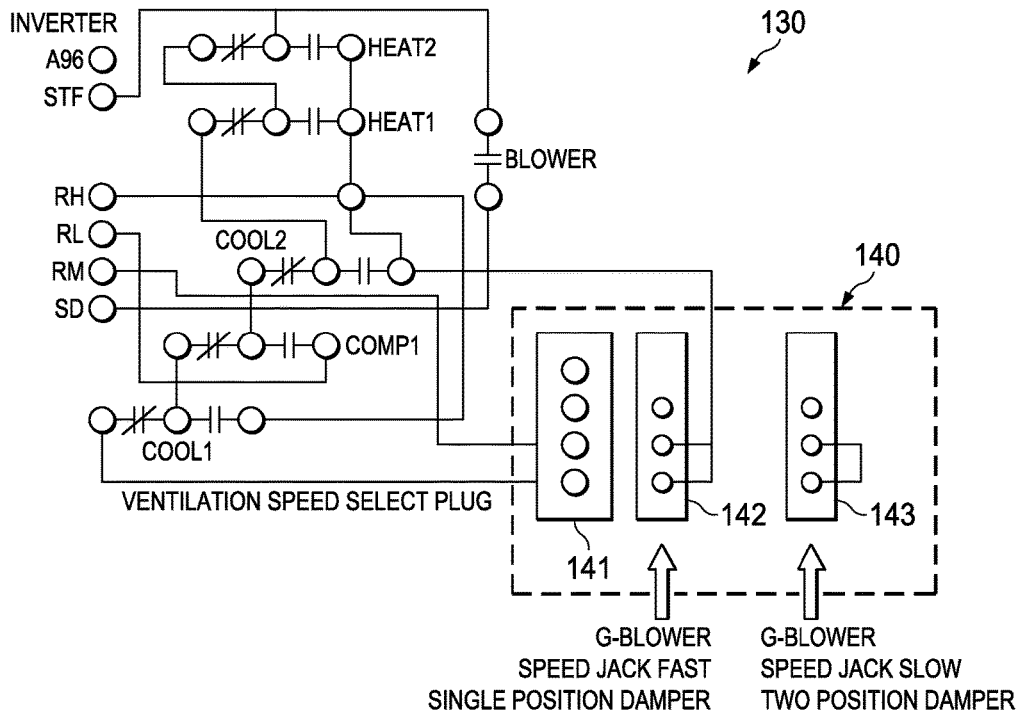
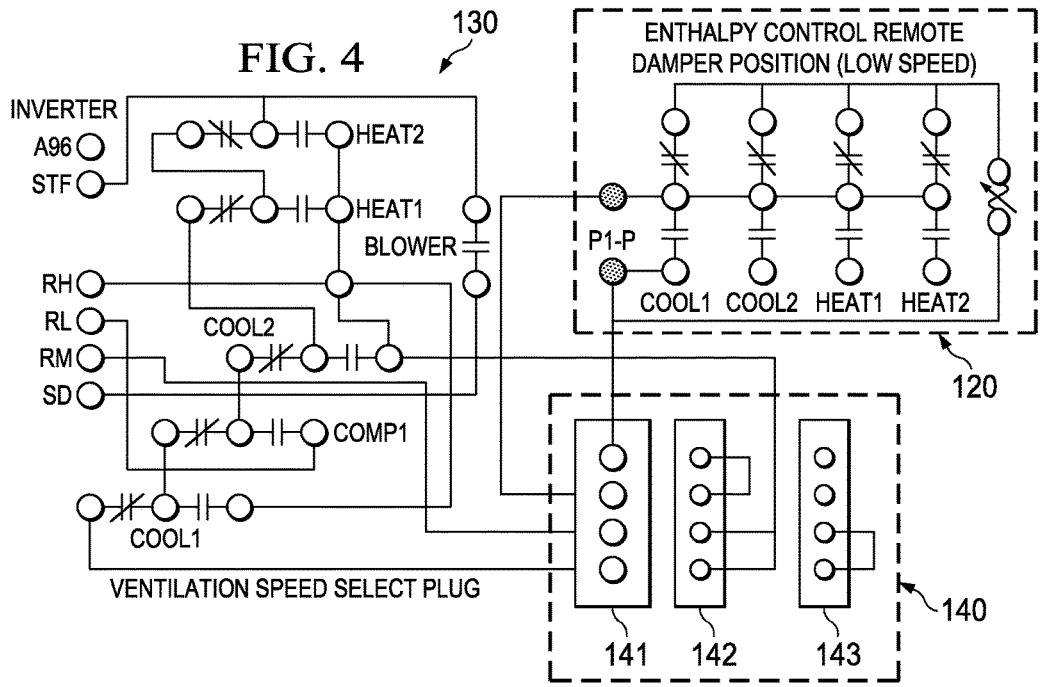

INVERTER CONTROLLER, METHOD OF OPERATION THEREOF AND FIELD-INSTALLABLE RETROFIT KIT INCORPORATING THE SAME

TECHNICAL FIELD

This application is directed, in general, to heating, ventilation and air conditioning (HVAC) systems and, more specifically, to an inverter controller, a method of operating the same and a field-installable retrofit kit incorporating the controller or the method.

BACKGROUND

Starting in 2012, California and other states will require all HVAC systems of at least six tons capacity having two or more refrigeration stages to reduce blower speed by 33% when operated at part-load cooling. In response, various manufacturers have set about designing new HVAC systems, such as rooftop units (RTUs) capable of complying with these new, "two-speed" regulations.

Complying with the regulations is not a straightforward issue. One of the key items impacted by blower speed is the amount of fresh air that the HVAC system provides. Customers are left with an unfortunate choice: either operate the blower at high speed and over-ventilate, or operate the blower at low speed and under-ventilate. Neither solution is acceptable. The former yields high energy costs; the latter runs afoul of building ventilation codes.

Another key concern is that, while blower speed can be reduced when the HVAC system is cooling, the same can be quite harmful when the HVAC system is heating. Reducing blower speed when the HVAC system is in a heating mode reduces heat exchanger airflow, causing system shutdowns dues to overheating and premature heat exchange failures.

As stated above, various manufacturers are designing new HVAC systems to accommodate multi-speed blower operation and comply with the two-speed regulations. However, the new systems are designed from the ground up using (e.g., microprocessor-based) direct digital controls (DDCs) to accommodate the many modes in which the HVAC systems should operate. An overwhelming number of today's HVAC systems, including the huge installed base of existing HVAC systems in service all over the world, lack DDCs and are therefore distinctly disadvantaged in trying to comply—simply reducing blower speed unacceptably disrupts their operation. To add to the problems, HVAC system manufacturers are unsure that they can justify offering HVAC systems designed to comply with regulations in place in only a few states; customers in states that have not adopted them are likely to refuse to pay additional money to achieve unnecessary compliance.

SUMMARY

One aspect provides an inverter controller. In one embodiment, the controller includes: (1) a thermostat interface configured to receive conventional thermostat signals providing for a ventilation mode, first- and second-stage cooling modes and at least one heating mode and provide relay control signals for an inverter forward start relay, first- and second-stage cooling speed select relays and at least one heating relay and (2) an inverter controller coupled to the thermostat interface and configured to receive the relay control signals and provide an inverter forward start signal, an inverter high speed set, an inverter medium speed set and an inverter ventilation speed set.

Another aspect provides a method of operating an inverter controller. In one embodiment, the method includes: (1) receiving conventional thermostat signals providing for a ventilation mode, first- and second-stage cooling modes and at least one heating mode, (2) providing relay control signals for an inverter forward start relay, first- and second-stage cooling speed select relays and at least one heating relay based on the conventional thermostat signals and (3) providing an inverter forward start signal, an inverter high speed set, an inverter medium speed set and an inverter ventilation speed set based on the relay control signals.

Yet another aspect provides an inverter controller kit. In one embodiment, the kit includes: (1) a thermostat interface configured to receive conventional thermostat signals providing for a ventilation mode, first- and second-stage cooling modes and at least one heating mode and provide relay control signals for an inverter forward start relay, first- and second-stage cooling speed select relays and at least one heating relay and (2) a module having: (2a) an inverter controller coupled to the thermostat interface and configured to receive the relay control signals and provide an inverter forward start signal, an inverter high speed set, an inverter medium speed set and an inverter ventilation speed set, (2b) a field-configurable blower speed selector coupled to the inverter controller and configured to select between a single-speed blower and a dual-speed blower and (2c) a plurality of relays configured to receive and employ the relay control signals.

BRIEF DESCRIPTION

Reference is now made to the following descriptions taken in conjunction with the accompanying drawings, in which:

FIG. 3 is a schematic diagram of one embodiment of an inverter controller and the field-configurable blower speed selector of the inverter controller kit of FIG. 1;

FIG. 4 is a schematic diagram of an alternative embodiment of the inverter controller of FIG. 3.

DETAILED DESCRIPTION

Figure 1:
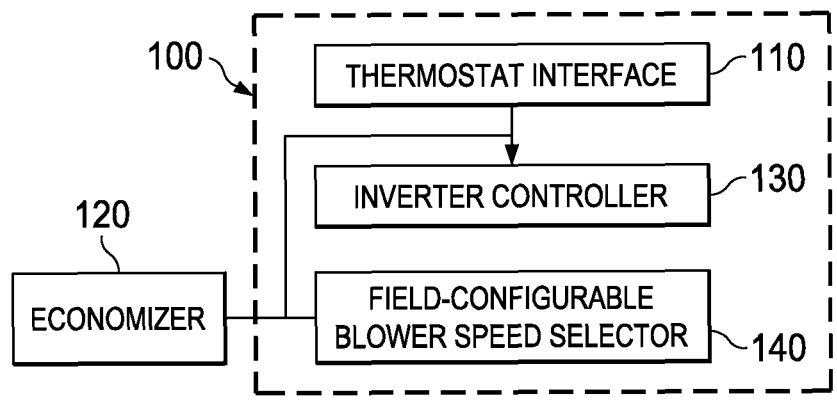
FIG. 1 is a block diagram of one embodiment of an inverter controller kit.

What is needed is a way for HVAC systems lacking DDCs to accommodate multi-speed blower operation without compromising system performance and without adding undue cost and complication to systems being sold to customers who do not want or need multi-speed blowers. What is further needed is a way to adapt HVAC systems that do not have DDCs so they can accommodate multi-speed blower operation without requiring them to be rewired. What is yet further needed in the art is a way to retrofit existing HVAC systems for multi-speed blower operation in the field in a straightforward manner and, again, without requiring the system to be rewired. What is still further needed is a way to configure inverter controllers, which are controllers for blower motors, such that the blowers can accommodate multi-speed operation.

Accordingly, introduced herein are various embodiments of an inverter controller, a method of operating the inverter controller and a field-installable retrofit kit incorporating the controller or the method. Certain of the embodiments employ cascading relay logic in lieu of a DDC. Other embodiments employ a DDC that supplements, rather than replaces, the existing wiring in an HVAC. The relay logic and method automatically give blower speed precedence to modes that involve heating so blower speed is not reduced to undesirable levels. In some embodiments, the relay logic and method call for higher blower speeds if, for some reason, the thermostat providing control signals to the inverter controller gives concurrent heating and cooling commands.

In various embodiments, the inverter controller and method do not require the addition or removal of factory wiring, other than relocating blower contactor control and power connections to a subassembly containing the inverter controller and relays. In certain embodiments, the inverter controller and method do not interfere or interact with existing cooling or heating safety circuits. In various embodiments, the inverter controller and method provide maximum energy savings. In at least one embodiment, the control logic automatically calls for high-speed blower operation in the free cooling mode and in the free cooling with compressor assist mode. In at least one related embodiment, ventilation speed is set independently from the low cooling mode. In some embodiments, the control logic and method automatically call for high speed blower operation in the full cooling mode or any heating mode for safety.

In various embodiments, the inverter controller can be used on heat pump units having an emergency (W2) electric heating mode. In certain embodiments, the inverter controller can safely be used with supermarket re-heat installations.

In various embodiments, the field-installable retrofit kit has a field-selectable blower speed selector that automatically switches selects between single-position, high-speed blower operation for commissioning and low-speed blower operation for ventilation. In certain embodiments, the blower speed selector also causes an economizer damper to move automatically between positions appropriate for high- and low-speed blower operation, making installation and setup straightforward and less error-prone.

In various embodiments, the field-installable retrofit kit can be fully factory assembled and tested. Certain of the embodiments of the field-installable retrofit kit combine the inverter controller and the relays into one subassembly that becomes a "plug-and-play" module. In one embodiment, the inverter controller does not include a DDC. In another embodiment, the inverter controller includes a DDC. With such module, no need exists to remove any thermostat wires, resulting in a lower risk of miswiring problems or manufacturing mistakes.

Certain embodiments of the controller, method and kit illustrated and described herein emulate the control strategy that DDCs carry out, but without requiring digital controllers or new wiring configurations. In these embodiments, the controller, method and kit provide the following modes: a dedicated ventilation mode (G), factory set to 66% of full blower speed, but field-configurable; a first-stage cooling mode (Y1), factory set to 66% of full blower speed to comply with two-speed regulations; a second-stage cooling mode (Y2) set to 100% of full blower speed; first- and second stage heating modes (W1, W2), both set to 100% of full blower speed and a free cooling (economy) mode set to 100% of full blower speed. These embodiments also control an economizer damper such that its positions automatically switch from low to high speed to maintain the appropriate airflow rate for the various operational modes.

The illustrated and described controller and kit embodiments provide a relatively simple system in which three relays provide two cooling speeds for two cooling modes. Additional cooling speeds are attainable by adding one relay for each cooling stage. Three-stage blower control is attained with only three relays. Additional blower speeds (e.g., for high-speed free-cool and high-speed emergency electric heat modes) are attainable by adding two relays.

Other embodiments of the controller, method and kit illustrated and described herein employ a DDC, but do not require the HVAC to be rewired. In one of these embodiments, the controller, method and kit provide the following modes: a dedicated ventilation mode (G) having a customizable speed; fully-configurable first- and second-stage cooling modes (Y1, Y2); fully-configurable first- and second-stage heating modes (W1, W2) and a free cooling (economy) mode set to 100% of full blower speed. Some embodiments provide fully adjustable economizer damper control; another embodiment provides configurable low- and high-speed settings to maintain the appropriate airflow rate for the various operational modes; and still another embodiment provides three such settings. Other embodiments provide manual bypass and automatic bypass. Still other embodiments derive their power from onboard power supplies, while other embodiments employ their power from variable frequency drives (VFDs).

Certain of the embodiments (generally summarized in Table 1, below) will now be illustrated and described, with the understanding that embodiments not specifically illustrated or described fall within the broad scope of the invention as claimed.

TABLE 1

General Summary of Described Embodiments

| | Embodiment 1 | Embodiment 2 | Embodiment 3 |
|---|---|---|---|
| Economizer control | 2 adjustable potentiometers | 0 to 10 V adjustable signal | 0 to 10 V adjustable signal |
| Blower speed control | 2 speeds on VFD | 0 to 10 V adjustable signal | 0 to 10 V adjustable signal |
| Number of speeds | 2 speeds | 4 speeds | 4 to 7 speeds |
| Speed settings | Fixed | User configurable | User configurable |
| Minimum economizer position | 2 settings | 2 settings | 2 to 3 settings |
| Minimum economizer position setting | User configurable | User configurable | User configurable |
| DDC | No | Yes | Yes |
| Bypass type | Manual | Manual | Automatic |
| Power source | VFD power | Onboard DC power supply | Onboard DC power supply |
| Ventilation speed selection | Switch-selectable between high and low | Separate, customizable | Separate, customizable |

FIG. 1 is a block diagram of one embodiment of an inverter controller kit 100. In the illustrated embodiment, the kit 100 takes the form of a module that can be field-installed in an existing HVAC system without requiring the HVAC system to be rewired. The illustrated embodiment includes a thermostat interface 110. An economizer 120 is coupled to the thermostat interface 110. A inverter controller 130 is coupled to the thermostat interface 110. A field-configurable blower speed selector 140 is also coupled to the thermostat interface 110 and the inverter controller 130.

The thermostat interface 110 is configured to receive conventional thermostat signals providing for a ventilation mode (G), first- and second-stage cooling modes (Y1, Y2) and first- and second-stage heating modes (W1, W2) and provide relay control signals for an inverter forward start relay, first- and second-stage cooling speed select relays (Comp1, Cool2), heating and emergency heating override relays (Heat1, Heat2), a free cooling relay (Cool1) and a mechanical cooling (compressor) relay (K1).

The economizer 120 is an "air-side" economizer configured to compare the enthalpy of outside air and inside (e.g., recirculated) air and generate at least one signal based thereon. As those skilled in the pertinent art understand, economizers are designed to save energy in buildings by using cool outside air as a means of cooling the indoor space. When the enthalpy of the outside air is less than the enthalpy of the inside air, conditioning the outside air is more energy efficient than conditioning the inside air. When the outside air is both sufficiently cool and sufficiently dry (depending on the climate), it needs no additional conditioning. Employing the outside air to cool the indoor space under these conditions is called "free cooling." The illustrated embodiment employs a commercially-available economizer (e.g., a model W7212A economizer, available from the Honeywell International of Morris Township, New Jersey). Alternative embodiments employ other conventional or later-developed economizers.

The inverter controller 130 includes a plurality of relays and is configured to receive and employ the relay control signals to control the plurality of relays. In one embodiment, the inverter controller 130 is associated with an outdoor unit of an HVAC system. In the illustrated embodiment, the outdoor unit is a "rooftop" unit (RTU) of the HVAC system. The inverter controller 130 is designed to be installed in the outdoor unit as a single assembly, preferably in place of an existing inverter controller and at least some existing relays.

The inverter controller 130 is configured to receive relay control signals for an inverter forward start relay (Blower), first- and second-stage cooling speed select relays (Comp1, Cool2), heating and emergency heating override relays (Heat1, Heat2), a free cooling relay (Cool1) and a mechanical cooling (compressor) relay (K1) and provide the following signals to a motor control inverter (not shown): A96 STF, which is an inverter forward start (input) signal; A96 RH, which is an inverter high speed set (60 Hz); A96 RL, which is an inverter medium speed set (40 Hz, or 66% of full speed); A96 RM, which is an inverter ventilation speed set (40 Hz, or 66% of full speed) and A96 SD, which is an inverter 24 VDC output.

The field-configurable blower speed selector 140 is configured to allow the inverter controller kit to be configured for a particular installation, namely to allow the kit to be configured for a single-speed blower (a fast speed) or a dual-speed blower (a slow speed). In the illustrated embodiment, the field-configurable blower speed selector 140 also configures the damper to operate in conjunction with the blower speed: a single-position damper for a single-speed, fast blower or a two-position damper for a dual-speed, slow blower.

Figure 2:
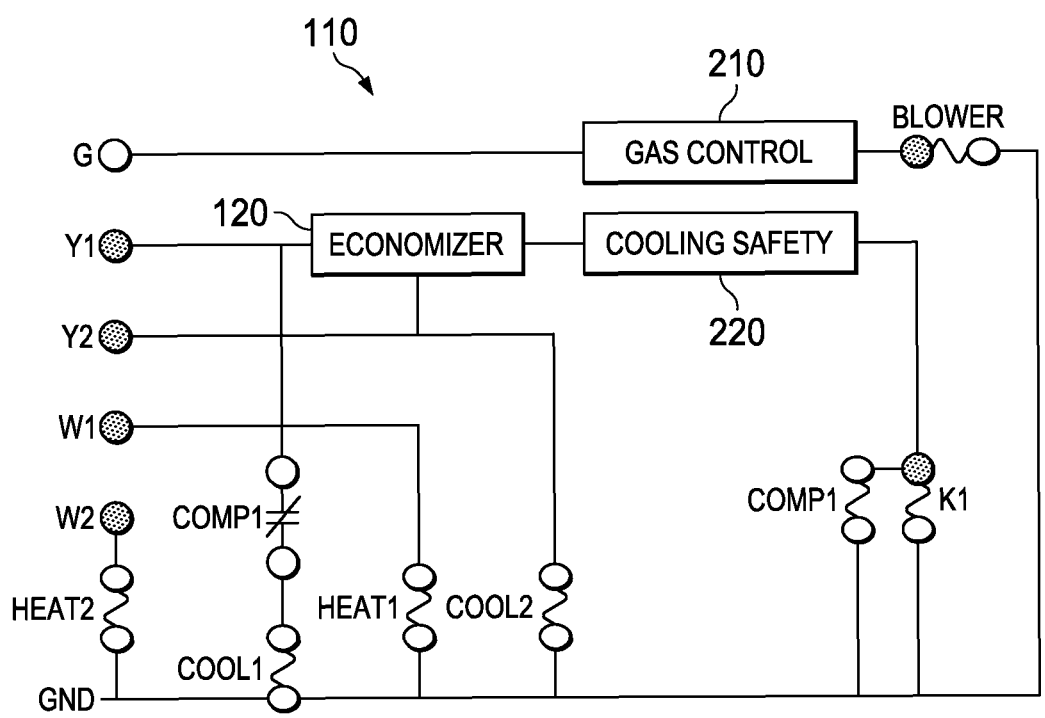
FIG. 2 is a schematic diagram of one embodiment of a thermostat interface of the inverter controller kit of FIG. 1.

FIG. 2 is a schematic diagram of one embodiment of the thermostat interface 110 of the inverter controller kit of FIG. 1. The thermostat interface 110 is configured to be coupled to a conventional thermostat via input lines that carry signals providing for a ventilation mode G, first- and second-stage cooling modes Y1, Y2 and first- and second-stage heating modes W1, W2. In the embodiment of FIG. 2, the economizer 120 is a conventional, commercially available economizer. Likewise, in the embodiment of FIG. 2, a gas control unit 210 and a cooling safety unit 220 are conventional, commercially available units.

In one embodiment, the gas control unit 210 is a Super Tradeline® model S8610U universal intermittent pilot gas ignition control module, commercially available from Honeywell International of Morris Township, New Jersey. Alternative embodiments employ other conventional or later-developed gas control units.

The thermostat interface 110 is further configured to provide relay control signals for an inverter forward start relay, first- and second-stage cooling speed select relays Comp1, Cool2, heating and emergency heating override relays Heat1, Heat2, a free cooling relay Cool1 and a mechanical cooling (compressor) relay K1. Table 2, below, sets forth the logic of the thermostat interface 110 of FIG. 2.

TABLE 2

Thermostat Interface Logic

| Thermostat | Blower Speed | Blower | Comp1 | Cool2 | Heat1 | Cool1 | Heat2 | K1 | K2 | Inverter | Damper Position |
|---|---|---|---|---|---|---|---|---|---|---|---|
| OFF | SLOW | OFF | OFF | OFF | OFF | OFF | OFF | OFF | OFF | OFF | CLOSED |
| G | SLOW | ON | OFF | OFF | OFF | OFF | OFF | OFF | OFF | LOW | P1 |
| G, Y1 | SLOW | ON | ON | OFF | OFF | OFF | OFF | ON | OFF | LOW | P1 |
| G, Y1, Y2 | SLOW | ON | ON | ON | OFF | OFF | OFF | ON | ON | HIGH | P2 |
| W1 | SLOW | ON | OFF | OFF | ON | OFF | OFF | OFF | OFF | HIGH | P2 |
| G1, Y1 ECON | SLOW | ON | OFF | OFF | OFF | ON | OFF | OFF | OFF | HIGH | P2 |
| G1, Y1 ECON, Y2 ECON | SLOW | ON | ON | ON | OFF | OFF | OFF | ON | OFF | HIGH | P2 |
| G, Y1, W1 | SLOW | ON | ON | OFF | ON | OFF | OFF | ON | OFF | HIGH | P2 |
| G, Y1, W1, W2 | SLOW | ON | ON | OFF | ON | OFF | ON | ON | OFF | HIGH | P2 |
| G, Y1, Y2, W1, W2 | SLOW | ON | ON | ON | ON | OFF | ON | ON | ON | HIGH | P2 |
| G, W2 | SLOW | ON | OFF | OFF | OFF | OFF | ON | OFF | OFF | HIGH | P2 |
| G, Y1, Y2, W1 | SLOW | ON | ON | OFF | ON | OFF | OFF | ON | ON | HIGH | P2 |
| OFF | FAST | OFF | OFF | OFF | OFF | OFF | OFF | OFF | OFF | OFF | CLOSED |
| G | FAST | ON | OFF | OFF | OFF | OFF | OFF | OFF | OFF | LOW | P1 |
| G, Y1 | FAST | ON | ON | OFF | OFF | OFF | OFF | ON | OFF | LOW | P1 |
| G, Y1, Y2 | FAST | ON | ON | ON | OFF | OFF | OFF | ON | ON | HIGH | P2 |
| W1 | FAST | on | OFF | OFF | ON | OFF | OFF | OFF | OFF | HIGH | P2 |
| G1, Y1 ECON | FAST | ON | OFF | OFF | OFF | ON | OFF | OFF | OFF | HIGH | P2 |
| G1, Y1 ECON, Y2 ECON | FAST | ON | ON | ON | OFF | OFF | OFF | ON | OFF | HIGH | P2 |
| G, Y1, W1 | FAST | ON | ON | OFF | ON | OFF | OFF | ON | OFF | HIGH | P2 |

TABLE 2-continued

Thermostat Interface Logic

| Thermostat | Blower Speed | Blower | Comp1 | Cool2 | Heat1 | Cool1 | Heat2 | K1 | K2 | Inverter | Damper Position |
|---|---|---|---|---|---|---|---|---|---|---|---|
| G, Y1, W1, W2 | FAST | ON | ON | OFF | ON | OFF | ON | ON | OFF | HIGH | P2 |
| G, Y1, Y2, W1, W2 | FAST | ON | ON | ON | ON | OFF | ON | ON | ON | HIGH | P2 |
| G, W2 | FAST | ON | OFF | OFF | OFF | OFF | ON | OFF | OFF | HIGH | P2 |
| G, Y1, Y2, W1 | FAST | ON | ON | OFF | ON | OFF | OFF | ON | ON | HIGH | P2 |

Column 2 of Table 2, above, gives the position of the field-configurable blower speed selector 140 of FIG. 1. The field-configurable blower speed selector 140 can be set to a fast speed or a slow speed.

As is apparent from FIG. 2, the thermostat is connected to more than only G, Y1 and Y2. The direct approach to adapt a constant air volume (CAV) HVAC system to a multi-speed air volume (MSAV) HVAC system would be to design an inverter controller that only operates with G (ventilation), Y1 (first-stage cooling) and Y2 (second-stage cooling) signals from the thermostat. However, as direct as this approach may be, it results in an improperly designed inverter controller. The inverter controller would be improperly designed, because every part of the HVAC system that is controlled by these and the other thermostat signals must be modified to work with the inverter controller. The result would be the need to create multi-speed sequences for each possible operating mode of the HVACE system. Thus the direct approach results in a complicated systems that requires various layers of relay logic to operate properly. Further, because the approach is complicated, it can only be factory-installed as a practical matter. Were field installation to be attempted, the chance of interfering with HVAC safety circuits is so high that field installation would be deemed too risky.

Instead, accordingly to the approach taken in the controller, method and kit disclosed herein, the relays that ultimately energize the compressor in the refrigeration circuit are used to activate inverter speed settings. Inverter speed controls are tied to the contactors, and three relays are used to control a two-stage heating and two stage cooling HVAC system.

FIG. 3 is a schematic diagram of one embodiment of the inverter controller 130 and the field-configurable blower speed selector 140 of the inverter controller kit of FIG. 1. The inverter controller 130 is configured to receive relay control signals for an inverter forward start relay Blower, first- and second-stage cooling speed select relays Comp1, Cool2, heating and emergency heating override relays Heat1, Heat2, a free cooling relay Cool1 and a mechanical cooling (compressor) relay K1. The inverter controller 130 is further configured to provide the following signals to a motor control inverter (not shown): A96 STF, which is an inverter forward start (input) signal; A96 RH, which is an inverter high speed set (60 Hz); A96 RL, which is an inverter medium speed set (40 Hz, or 66% of full speed); A96 RM, which is an inverter ventilation speed set (40 Hz, or 66% of full speed) and A96 SD, which is an inverter 24 VDC output. The field-configurable blower speed selector 140 is also shown in greater detail. A receptacle 141 can receive either a fast plug 142 or a slow plug 143. The fast plug 142 and slow plug 143 provide alternative configurations to the inverter controller 130 as FIG. 3 shows.

FIG. 4 is a schematic diagram of an alternative embodiment of the inverter controller 130 of FIG. 3. The embodiment of FIG. 4 shows how an economizer 120 can control a damper 410. FIG. 4 is presented primarily for the purpose of showing how Cool1, Cool2, Heat1 and Heat2 are configured such that the economizer 120 controls the damper 410 and further how the fast plug 142 and slow plug 143 reconfigure the operation of the economizer 120.

Figure 5:
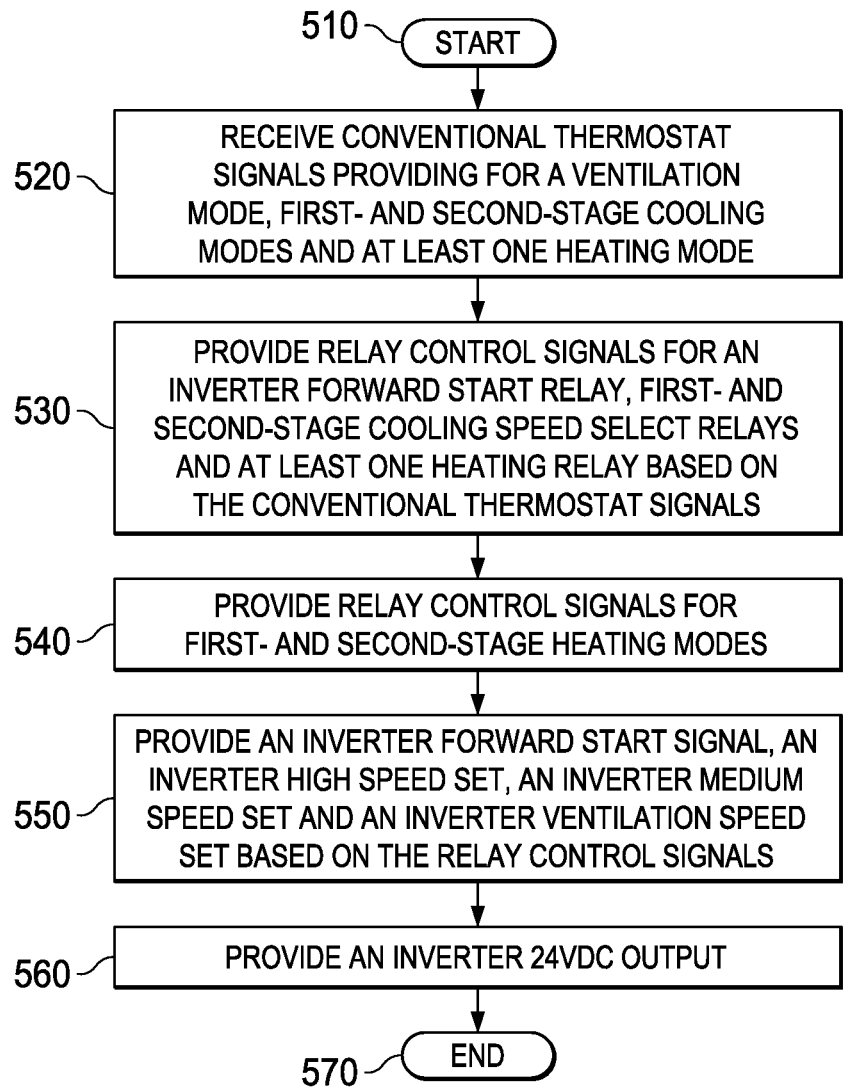
FIG. 5 is a flow diagram of one embodiment of a method of operating an inverter controller.

FIG. 5 is a flow diagram of one embodiment of a method of operating an inverter controller. The method begins in a start step 510. In a step 520, conventional thermostat signals are received. The conventional thermostat signals provide for a ventilation mode, first- and second-stage cooling modes and at least one heating mode. In a step 530, relay control signals are provided. The relay control signals provide for an inverter forward start relay, first- and second-stage cooling speed select relays and at least one heating relay based on the conventional thermostat signals. In a step 540, in one embodiment, relay control signals are provided for first- and second-stage heating modes. In a step 550, an inverter forward start signal, an inverter high speed set, an inverter medium speed set and an inverter ventilation speed set are provided based on the relay control signals. In a step 560, an inverter 24 VDC output is also provided. The method ends in an end step 570.

Those skilled in the art to which this application relates will appreciate that other and further additions, deletions, substitutions and modifications may be made to the described embodiments.

What is claimed is:

1. A field-installable adapter for a heating, ventilation and air conditioning (HVAC) controller of an HVAC system having a blower and a compressor, comprising:
  a thermostat interface configured to receive conventional thermostat signals providing for a ventilation mode, first- and second-stage cooling modes, a free cooling mode that employs outside air to cool indoor space, and at least one heating mode, and provide relay control signals for an inverter forward start relay, first- and second-stage cooling speed select relays, a free cooling relay, and at least one heating relay based on the conventional thermostat signals, wherein the inverter forward start relay, first- and second-stage cooling speed select relays, the free cooling relay, and the at least one heating relay energizes the compressor;
  an inverter controller coupled to the thermostat interface and configured to:
    receive the relay control signals;
    when the free cooling relay is activated, activate inverter speed settings for controlling the blower to a high-speed blower operation by employing the relay control signals, the inverter speed settings further includes an inverter forward start signal, an inverter high speed set, an inverter medium speed set and an inverter ventilation speed set; and
  a field-configurable blower speed selector, coupled to the inverter controller and a damper, and configured to control the damper to operate as a two-position damper when the blower is a dual-speed blower.

2. The field-installable adapter as recited in claim 1 wherein the thermostat interface is further configured to provide relay control signals for first- and second-stage heating modes.

3. The field-installable adapter as recited in claim 1 wherein the thermostat interface is further configured to provide an inverter 24 VDC output.

4. The field-installable adapter as recited in claim 1 wherein the thermostat interface is further configured to receive a free cooling signal from an economizer, wherein the free cooling signal is based on a comparison of the enthalpy of outside air and inside air.

5. The field-installable adapter as recited in claim 1 wherein the field-configurable blower speed selector configured to select between a single-speed blower and a dual-speed blower.

6. The field-installable adapter as recited in claim 5 wherein the field-configurable blower speed selector controls the damper to operate as a one-position damper when the blower is a single-speed blower.

7. The field-installable adapter as recited in claim 1 wherein the inverter controller is further configured to activate inverter speed settings for switching the blower to a higher speed of blower operation when the relay control signals concurrently give a cooling command and a heating command.

8. A method of converting a single speed controller into a multi-speed controller for a blower of a heating, ventilation and air conditioning (HVAC) system, the method comprising:
receiving conventional thermostat signals providing for a ventilation mode, first- and second-stage cooling modes, a free cooling mode that employs outside air to cool indoor space, and at least one heating mode;
providing relay control signals for an inverter forward start relay, first- and second-stage cooling speed select relays, a free cooling relay, and at least one heating relay based on the conventional thermostat signals, wherein the inverter forward start relay, first- and second-stage cooling speed select relays, the free cooling relay, and the at least one heating relay energizes a compressor of the HVAC system;
providing inverter speed settings for controlling the blower by employing the relay control signals, wherein:
the inverter speed settings include controlling the blower to a high-speed blower operation by employing the relay control signals when the free cooling relay is activated, the inverter speed settings further includes an inverter forward start signal, an inverter high speed set, an inverter medium speed set and an inverter ventilation speed set; and
controlling a damper to operate as a two-position damper when the blower is a dual-speed blower.

9. The method as recited in claim 8 wherein the providing the relay control signals further comprises providing relay control signals for first- and second-stage heating modes.

10. The method as recited in claim 8 further comprising providing an inverter 24 VDC output.

11. The method as recited in claim 8 further comprising receiving a free cooling signal from an economizer, wherein the free cooling signal is based on a comparison of the enthalpy of outside air and inside air.

12. The method as recited in claim 8 further comprising selecting between a single-speed blower and a dual-speed blower with a field-configurable blower speed selector.

13. The method as recited in claim 8 further comprising controlling the damper to operate as a one-position damper when the blower is a single-speed blower.

14. The method as recited in claim 8 wherein the inverter speed settings include switching the blower to a higher speed of blower operation when the relay control signals concurrently give a cooling command and a heating command.

15. A field-installable retrofit kit for converting a single speed blower of a heating, ventilation and air conditioning (HVAC) system into a multi-speed blower, said retrofit kit comprising:
a thermostat interface configured to receive conventional thermostat signals providing for a ventilation mode, first- and second-stage cooling modes, a free cooling mode that employs outside air to cool indoor space, and at least one heating mode and provide relay control signals, based on the conventional thermostat signals, for an inverter forward start relay, first- and second-stage cooling speed select relays, a free cooling relay, and at least one heating relay, wherein the inverter forward start relay, first- and second-stage cooling speed select relays, the free cooling relay, and the at least one heating relay energizes a compressor of the HVAC system; and
a module having:
an inverter controller coupled to the thermostat interface and configured to:
receive the relay control signals;
when the free cooling relay is activated, provide inverter speed settings wherein the inverter speed settings include controlling the blower to a high-speed blower operation by employing the relay control signals, the inverter speed settings further include an inverter forward start signal, an inverter high speed set, an inverter medium speed set and an inverter ventilation speed set,
a field-configurable blower speed selector coupled to the inverter controller and a damper and configured to:
select between a single-speed blower and a dual-speed blower; and
control the damper to operate as a two-position damper when the blower is a dual-speed blower; and
a plurality of relays configured to receive and employ the relay control signals.

16. The retrofit kit as recited in claim 15 wherein the inverter controller is further configured to provide inverter speed settings to switch the blower to a higher speed of blower operation when the relay control signals concurrently give a cooling command and a heating command.

17. The retrofit kit as recited in claim 15 wherein the thermostat interface is further configured to provide relay control signals for first- and second-stage heating modes.

18. The retrofit kit as recited in claim 15 wherein the thermostat interface is further configured to receive a free cooling signal from an economizer, wherein the free cooling signal is based on a comparison of the enthalpy of outside air and inside air.

19. The retrofit kit as recited in claim 15 wherein the field-configurable blower speed selector is further configured to automatically switch between a blower speed for commissioning and a blower speed for ventilation.

20. The retrofit kit as recited in claim 15 wherein the field-configurable blower speed selector further configures a damper.

\* \* \* \* \*